May 21, 1968      D. G. GREENLY      3,383,920
CIRCUIT FOR MAKING TEMPERATURE MEASUREMENTS
Filed April 8, 1965
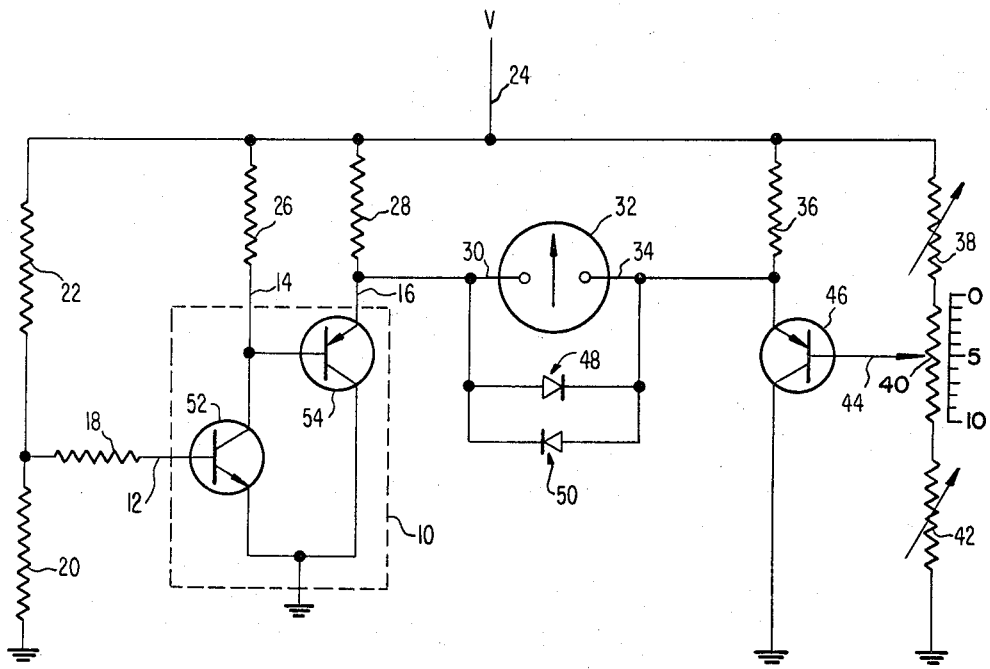
INVENTOR
DAYTON GEORGE GREENLY
BY *Robert B. Harmon*
ATTORNEY

United States Patent Office 3,383,920
Patented May 21, 1968

3,383,920
CIRCUIT FOR MAKING TEMPERATURE
MEASUREMENTS
Dayton George Greenly, State College, Pa., assignor to
HRB-Singer, Inc., State College, Pa., a corporation of
Delaware
Filed Apr. 8, 1965, Ser. No. 446,487
3 Claims. (Cl. 73—362)

ABSTRACT OF THE DISCLOSURE

A transistor circuit for making temperature measurements in which the variation of both the base-emitter voltage and the current gain, with temperature, is employed, having a grounded emitter amplifier which is temperature responsive, is coupled to an emitter follower whose output is applied to a balancing means, having a visual indicator coupled thereto.

---

The present invention relates to temperature transducers in general, and more particularly, to temperature sensitive solid-state electronic elements employed in electrical circuitry to measure external temperatures over a predetermined range.

In the most common prior art techniques for making temperature measurements by electrical means, a thermocouple or thermistor was generally employed as a temperature transducer in conjunction with a bridge circuit and an indicating means for establishing a visual representation of the temperature of a surrounding atmosphere. The temperature transducers employed varied over a considerable range depending upon the sensitivity, linearity, operating range, size and cost desired.

According to a contemplated use for the measuring circuit of the present invention, a temperature sensing means may be employed at a location remote from the remaining elements of the measuring circuit. For example, in a system in which the temperature of a rotating shutter blade is employed as a reference for a video signal, such as the temperature of a rotating disc in an infrared detecting system, the movable character and the speed of the rotating blade necessitate the measuring of temperature by means other than by means establishing intimate contact therewith. Ordinarily, the shutter blade is housed in a compartment which interior is lined with a material of very low heat conductivity, and the compartment is constructed such that air flow into and out of the compartment is severely restricted. The housing is also generally constructed so as to closely encompass the shutter blade, thus maintaining the volume of surrounding air at a minimum.

Consequently, in accordance with the present invention, a temperature sensing means which comprises solid-state electronic means may be mounted in close relationship to the rotating shutter blade on a mounting base plate of high thermal insulation such that the temperature of the blade may be determined essentially by the temperature of a small volume of its surrounding air. Thus, by utilizing the temperature-dependent parameters of a transistor amplifier, for example, a temperature sensing means of substantially small size and relatively low cost is attained.

It is therefore a primary object of the present invention to provide a temperature measuring circuit with a temperature transducing means capable of rendering a high degree of sensitivity and linearity over a predetermined range of temperatures.

An additional object of the present invention is to provide a temperature measuring circuit which employs temperature-dependent parameters of a solid-state electronic means positioned in an environment which temperature is to be measured, the solid-state electronic means being provided to produce an output current indicative of the temperature of the environment, whereby a substantially high degree of linear relationship between the output current and the environmental temperature is attained.

A further object of the present invention is to provide an electrical circuit for making temperature measurements which circuit includes a transistorized amplifying means having a fixed condition of input bias applied thereto such that environmental temperature changes cause an output current of the transistor to vary; a calibrated potentiometer and a null meter, or a separate calibrated meter, also being included in the measuring circuit to cancel the output current of the amplifying means and to present an indication of the temperature change thereby rendering either an indirect reading, or a direct reading, of the temperature measured.

A still further object of the present invention is to provide an electrical circuit for making temperature measurements which circuit includes a plurality of temperature sensitive transistor amplifiers to improve the linear relationship between the temperature measured and an output characteristic of the measuring circuit.

With the foregoing and other objects in view, the invention resides in the following specification and claims, certain embodiments and details of construction being illustrated by the specification when considered with the accompanying drawing.

Referring to the drawing, there is presented an illustration of certain electronic elements and appropriate connections therefor for establishing an electrical circuit to accomplish the purposes of the present invention. A temperature sensing means is generally represented by reference numeral 10. Temperature sensing means 10 is provided with input connecting means 12 and output connecting means 14 and 16. A biasing means is provided preferably to establish a fixed condition of bias potential to the input connecting means 12. The input connecting means 12, as shown, is therefore connected to one end of a resistor 18. The opposite end of resistor 18 is connected to ground through a resistor 20 and is connected through a resistor 22 to a bias voltage V, the bias voltage being connected to a lead 24 which is, in turn, directly connected to resistor 22.

In a preferred form of the present invention, bias voltage V is connected through a resistance 22 to output connecting means 14 and through a resistance 28 to a first output connecting means 30 of any well-known type null meter 32. A second connecting means 34 of the null meter 32 is connected to one end of a resistance 36, the opposite end of resistance 36 being connected to bias voltage lead 24 and to one end of a variable potentiometer 38. The opposite end of potentiometer 38 is connected to one end of a variable potentiometer 40, the opposite end of potentiometer 40 being connected to one end of a variable potentiometer 42 and the opposite end of potentiometer 42 being connected to ground. Variable potentiometer 40 is preferably provided with a suitable scale means, and an adjustable indicator, such as a dial and pointer as shown. An adjustable pointer of a scale means is represented at 44. Pointer 44 also serves as a variable tap means connected to variable potentiometer 40.

The second connecting means 34 of null meter 32, in addition to being connected to resistance 36, is also connected to a transistor 46. Thus, as indicated in the drawing, null meter 32 is connected through connecting means 34 to transistor 46 which transistor is preferably arranged in an emitter follower connection with the emitter being connected to the null meter. The base connection of transistor 46 is attached to the pointer 44 on the scale means of variable potentiometer 40.

To provide a protecting means for null meter 32, when the meter is substantially out of balance, diodes 48 and 50 are preferably connected from the first connecting means 30 to the second connecting means 34 of the meter, a positive terminal of diode 48 being connected to the first connection 30 and a negative terminal of diode 48 being connected to second connection 34. Similarly, a positive terminal of diode 50 is connected to second connection 34, and a negative terminal of diode 50 is connected to first connection 30.

In a preferred form of the present invention, temperature sensing means 10 includes two transistor devices, each being provided with emitter, collector and base terminals, one being connected as a grounded emitter amplifier and one being connected as an emitter follower. The input connecting means 12 is connected to a base terminal of a first transistor 52. An emitter terminal of transistor 52 is connected to ground and a collector terminal of transistor 52 is connected to output connecting means 14 and to a base terminal of a second transistor 54. A collector terminal of transistor 54 is connected to ground and an emitter terminal of transistor 54 is connected to output connecting means 16. Although transistor 52 is illustrated as NPN transistor and transistor 54 is illustrated as a PNP transistor, it is realized that an opposite form for either or both transistors may be employed without departing from any of the essential characteristics of the present invention.

Having described the particular connections of the electronic elements for an embodiment of a temperature measuring circuit of the present invention, as illustrated in the drawing, the operation of the measuring circuit will be more readily understood from the following description.

Due to the predictable manner by which the base-emitter voltage and the current amplification of a transistor change with variations of the temperature of the atmosphere surrounding the transistor, a very nearly linear variation of collector current as a function of temperature is produced over a given range of operating temperatures. The temperature range at which a substantially linear relationship exists between the transistor output current and the temperature of the surrounding atmosphere may be varied by varying the gain of the transistor amplifier circuit, such as by changing the resistive value of resistor 26, or by substituting a different transistor having a different current gain, or by adding additional amplifier stages to the temperature sensing means 10. Thus, the selection of a proper transistor for a given operating temperature range can produce a highly linear variation of collector current as a function of temperature. Stated somewhat differently, the linearity obtained is therefore a function of the care taken in selecting the type of transistor employed in view of the desired operating temperature range, and the sensitivity of the temperature measuring circuit is controllable by the freedom afforded in adjusting an amplifier gain.

It is realized, however, that transistor 54 may be eliminated from the temperature sensing means and from the temperature measuring circuit entirely without effecting the essential over-all function of the circuit. However, an increasing temperature causes an increasing base current and a decreasing base-emitter voltage of transistor 54 altering the output current of the temperature sensing means 10. The change in output current created by transistor 54 is preferably in a direction to counteract any non-linearity of the current gain in transistor 52 which may occur above certain temperatures within the predetermined operating temperature range. Therefore, the inclusion of transistor 54 in the temperature sensing means 10 improves the over-all linearity of the temperature measuring circuit.

The variable potentiometer 40 together with an associated calibrated scale means and the null meter 32, preferably of the zero-center variety, are employed to cancel the output voltage from the temperature sensing means 10. With the scale means calibrated in terms of degrees of temperature, the temperature of the atmosphere surrounding the transistor may be indicated on the scale by adjusting variable potentiometer 40 to present a null, or zero, reading on meter 32. In order to provide a calibration adjustment such that the voltage across variable potentiometer 40 will correspond to the maximum and minimum values of voltages appearing at the output connecting means 16 of temperature sensing means 10 over the temperature range of interest, potentiometers 38 and 42 are provided. Thus, temperature may be read directly from the calibrated scale means of variable potentiometer 40 after tap means 44 has been adjusted to present a known indication, or balance, on meter 32.

From the foregoing, it is observed that transistor 52 is provided such that its parameter variation with temperature enables the means of making the desired temperature measurement.

In the event that temperature sensing means 10 is employed at a location remote from the remaining elements of the temperature measuring circuit, it is desirable that transistor 54 be connected in an emitter follower configuration to enable an impedance transformation for transistor 52. Such impedance transformation is desirable since the high output impedance of transistor 52 must be employed in driving the null meter through an impedance created by a relatively long length of cable connecting the sensing means to the meter. Transistor 54 and resistor 28 are therefore preferably connected as an emitter follower circuit to provide a low impedance connection between the temperature sensing means 10 and the cable connected to null meter 32. Transistor 46 and resistor 36 are also preferably connected as an emitter follower circuit to provide impedance transformation between variable potentiometer 40 and null meter 32.

It is apparent that various modifications of the above-described circuit are possible without departing from the essential characteristics of the present invention. For example, null meter 32 and variable potentiometer 40 might be replaced by a calibrated meter positioned in the emitter circuit of transistor 54 thereby enabling a direct indication of temperature. Additionally, the sensitivity of the circuit may be controlled by increasing the ohmic value of resistor 26 or by adding additional stages of transistor amplification so as to increase gain of the amplifier portion of the circuit. Preferably, the additional stages would be similar to the amplifier stage 52 in that the transistors themselves would be located in the temperature sensing means 10 and the remaining circuit components would be mounted elsewhere.

The invention may therefore be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A circuit for making temperature measurements which comprises a temperature sensing means including input terminal means and output terminal means, temperature-dependent solid-state electronic means connected within said temperature sensing means and between the input terminal means and the output terminal means, a biasing means for establishing a fixed condition of electrical bias applied to the input terminal means of said temperature sensing means, an electrical condition balancing means connected to the output terminal means, a potential adjusting means included within said electrical balancing means and connected to said biasing means, and indicating means attached to said potential adjusting means, said solid state electronic means including transistor amplifying means, said transistor amplifying means further including a first transistor having base, emitter and collector electrodes, and a second transistor having base, emitter, and collector electrodes, the base electrode of said first transistor being connected to the input terminal means and the emitter electrode of said first transistor together with the collector electrode of said second transistor being connected to a ground potential, the collector electrode of said first transistor being connected to the base electrode of said second transistor, and the collector electrode of said first transistor and the emitter electrode of said second transistor being connected to the output terminal means.

2. A circuit for making temperature measurements which comprises
- a temperature sensing means including input terminal means and output terminal means,
- temperature-dependent solid-state electronic means connected within said temperature sensing means and between the input terminal means and the output terminal means,
- a biasing means for establishing a fixed condition of electrical bias applied to the input terminal means of said temperature sensing means,
- an electrical condition balancing means connected to the output terminal means, a potential adjusting means included within said electrical balancing means and connected to said biasing means,
- and visual indicating means attached to said potential adjusting means, said solid-state electronic means includes a plurality of transistors each provided with emitter, base and collector electrodes, the base electrode of a first of said plurality of transistors being connected to the input terminal means of said temperature sensing means, the base electrode of each except the first of said plurality of transistors being connected to a collector electrode of a different transistor, the emitter electrode of a second of said plurality of transistors being connected to the output terminal means of said temperature sensing means, the collector electrode of the second of said plurality of transistors being connected to a ground potential, and the emitter electrodes of all except the second of said plurality of transistors being connected to a ground potential.

3. A circuit for making temperature measurements in an environment comprising
- temperature sensing means comprising a transistor amplifier having a grounded emitter, a base circuit including a base terminal, biasing means, and a collector terminal;
- said transistor amplifier providing an output at said collector dependent upon variation of the base-emitter voltage and the current gain, both of said characteristics being temperature responsive, whereby when said transistor amplifier is placed in said environment, it is temperature responsive;
- an emitter follower including a second transistor having output terminal means and input terminal means, said input terminal being coupled to the output of said transistor amplifier;
- an electrical condition balancing means connected to the output terminal means of said emitter follower;
- a potential adjusting means included within said electrical balancing means;
- indicating means attached to said potential adjusting means;
- said emitter of said first transistor together with the collector electrode of said second transistor being connected to a ground potential.

References Cited
UNITED STATES PATENTS

| | | | |
|---|---|---|---|
| 2,871,376 | 1/1959 | Kretzmer | 73—362 |
| 2,996,918 | 8/1961 | Hunter | 73—362 |
| 3,076,339 | 2/1963 | Barton | 73—362 |
| 3,092,998 | 6/1963 | Barton | 73—362 |

OTHER REFERENCES

White, A. G.; A Note on the Transistor as a Thermometer in the Journal of Scientific Instruments, vol. 32, November 1955, pp. 451–2.

DAVID SCHONBERG, Primary Examiner.

LOUIS R. PRINCE, Examiner.

F. SHOON, Assistant Examiner.